G. W. SCHOFIELD.
REVOLVING FIRE-ARMS.
No. 7,355. Reissued Oct. 17, 1876.
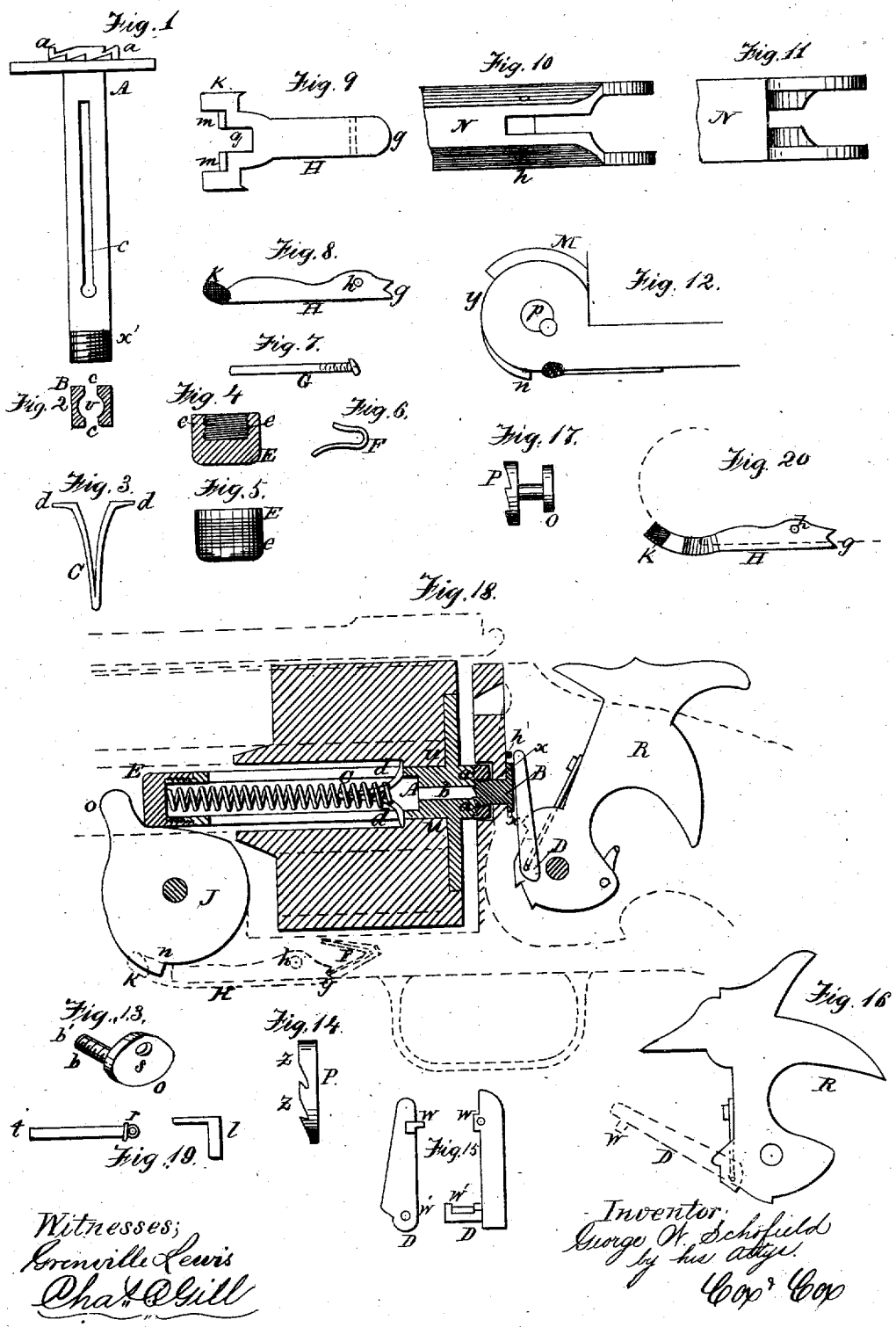
Witnesses;
Grenville Lewis
Chas. A. Gill
Inventor;
George W. Schofield
by his attys.
Cox & Cox
N. PETERS, PHOTO-LITHOGRAPHER, WASHINGTON, D. C.

UNITED STATES PATENT OFFICE.

GEORGE W. SCHOFIELD, OF UNITED STATES ARMY.

IMPROVEMENT IN REVOLVING FIRE-ARMS.

Specification forming part of Letters Patent No. 138,047, dated April 22, 1873; reissue No. 7,355, dated October 17, 1876; application filed September 25, 1876.

*To all whom it may concern:*

Be it known that I, GEORGE W. SCHOFIELD, of the Army of the United States, have invented certain new and useful Improvements in Revolving Fire-Arms; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The invention relates to that class of fire-arms which open for loading by turning on a pivot, which pivot connects the barrel and frame. The objects of the invention are, first, to provide a center ejector of such form and construction as to contain within itself the spring and spring-stop, which serve to retract it after being raised in the operation of ejecting empty shells; second, to provide an ejector-lifter for raising the ejector in the operation of operating the arm for the purpose of ejecting the empty shells or for loading; third, to provide a catch for moving and operating the lifter, and for releasing it when the empty shells are raised clear of the cylinder; fourth, to provide a means by which the cylinder is revolved by the motion of the hammer in cocking the piece, and without any uncovered opening between the lock mechanism and the cylinder.

Figure 1 is a side view of the center-acting ejector. Fig. 2 is a transverse sectional view of the same, showing the slots *c c* and circular cavity *v*. Fig. 3 is a side view of the ejector-spring stop, being also itself a double spring. Fig. 4 is a sectional view of the ejector-cap, by means of which the ejector-spring is held in place, and the bottom of which forms a surface upon which the ejector-lifter acts. Fig. 5 is a side view of the same. Fig. 6 is a side view of the lifter-catch spring. Fig. 7 is a side view of the pin upon which the lifter-catch pivots. Fig. 8 is a side view of the lifter-catch. Fig. 9 is an outer view of the same. Fig. 10 is a bottom view of the frame, showing the cavity in which the lifter-catch and spring operate. Fig. 11 is a top view of the same. Fig. 12 is a side view of that portion of the arm in which the frame is joined to the barrel, and showing the shoulder *y* on the barrel, which serves to free the lifter-catch from the shoulder *n* when the arm is opened. Fig. 13 is a perspective view of the crank with its axle *b*, its screw-thread *b'*, and cam-slot *s*, by means of which, in connection with the ratchet, Fig. 14, and operated by the hand, Fig. 15, which is raised by the motion of the hammer, Fig. 16, in cocking, the cylinder is revolved. Fig. 14 is a side view of the revolving ratchet, which, in connection with the crank, Fig. 13, and connected with the cylinder through its notches *z z* and the notches *a a* of the ejector, Fig. 1, and operated by the motion of the hammer in cocking, the cylinder is made to revolve. Fig. 15, D, is an inside and side view of the hand with its nose *w* and its axle *w'*, by means of which, through the nose *w* working in the cam-slot *s*, Fig. 13, the crank O is moved forward and back by the motions of the hammer. Fig. 16 is a side view of the hammer, showing the hand D in its proper position. Fig. 17 is a side view of the crank O and the ratchet P, joined together by means of the screw-threads *b'*, in their proper relations to each other. Fig. 18 is a sectional view of an arm with a revolving cylinder, and which opens for loading and for ejecting empty cartridge-shells by turning on a pivot which joins the frame to the barrel, showing the lifter J, the ejector A with its cap E E, spring-stop C, notches *a a*, and spiral spring, the revolving ratchet *z z*, the lifter-catch H H with its spring F and pivot G, the crank O, the hand D D, all in their proper positions, and showing their relations to each other and to other parts of the arm. Fig. 19 represents a modification of the construction of the stop for the spring. Fig. 20 is a side elevation of the lifter-catch, showing its relation to the pistol-frame.

A and B, Figs. 1 and 2, are a side and transverse sectional view of the center-acting ejector, showing the slots *c c*, through which the feet of the ejector-spring stop *d d* project and move the thread *x'*, upon which the cap E, Fig. 5, is screwed, and circular cavity *v*, in which the spiral spring operates; also, showing the notches *a a*, which correspond in number to the number of chambers in the cylinder, and are so arranged that when operated upon by the revolving ratchet P, Fig. 14, the cylinder is revolved so that the axes of the several chambers and the axis of the bore are successively brought into coincidence. C, Fig. 3, is a side view of the ejector-spring stop, which is itself a double spring, and by means of which the ejector-spring is made to act when the ejector is lifted, by the feet *d d* pressing against the shoulders *u u*, and thus causing the compression of the ejector-spring, so that when the lifter-catch H H, Figs. 8 and 9, is freed from the shoulders *n*, the ejector is promptly retracted by the reaction of the spring.

It is so constructed that, when the cap E is unscrewed and the ejector pulled up, so that the beveled surface of the feet *d d* come in contact with the bottom of the slot *c*, the legs are pressed together, so that the toes of the feet *d d* do not project beyond the outer surface of the ejector, thus permitting the complete withdrawal of the ejector from the cylinder, after which the ejector-spring stop and spring are readily removed from the ejector. E E, Figs. 4 and 5, show a sectional and side view of the ejector-cap, with the thread *e e*, by which it is screwed onto the ejector at $x'$, and the checkered surface $e^1$, to facilitate its unscrewing. This cap serves to hold the ejector spring and stop in their proper places in the circular cavity of the ejector, and its bottom forms a surface upon which the nose of the ejector-lifter J acts in raising the ejector. F, Fig. 6, is a side view of the lifter-catch spring, the shorter arm of which presses upon the lip *g* of the lifter-catch H, Fig. 9, thus holding it in place and throwing it back to place after the lifter-catch H is raised from the shoulder *n* of the ejector-lifter J. G, Fig. 7, is the pin upon which the lifter-catch H pivots. It is screwed into the frame, and its smooth part passes through the hole *h* in the lifter-catch. H H, Figs. 8 and 9, are a side and outer view of the lifter-catch, by means of which, when the arm is opened and broken down, the lifter J is revolved, forcing up its nose *o*, which, acting on the bottom of the ejector-cap E, raises the ejector, and forces out the empty shells. It is provided with a lip, *g*, pivot-hole *h*, notch *q*, ears *k k*, and beveled shoulders *m m*. The lifter-catch H is pivoted at a point in front of its rear extremity, and is capable of movement upon its pivot G when its said extremity is forced upward. The pivot G is at right angles to the motion of the lifter J. When fixed in place, as shown in the dotted lines in Fig. 18, the notch *q* receives the shoulder *n*, and, operated upon by the spring F, is held firmly in place, and the bottom of the notch *q* presses upon the shoulder *n*, so that, in opening the arm, the lifter J is carried around until the beveled shoulder *m*, Fig. 9, touches upon the beveled shoulder *y*, Fig. 12, which beveled shoulders, coming in contact, force back the forward part of the lifter-catch H, thus freeing the notch *q* from the shoulder *n*, at which moment the ejector is immediately retracted by the ejector-spring, and the lifter thus thrown back into its original position; then, in closing the arm, the lifter-catch H, as it passes over the rear surface of the shoulder *n*, is again raised, and, at the instant it clears the shoulder, is thrown into its place by the action of the catch-spring F acting on the lip *g*. By means of the ears *k k*, the surfaces of which are checkered, being pressed upon by the thumb and forefinger, the catch H can be freed from the shoulder *n* at any point after the ejector is started, or before it is started, thus enabling the operator to raise the empty shells or cartridges all of the way, or any portion of the way, out of the chambers, or to open the arm to its fullest extent without moving them at all. N N, Figs. 10 and 11, are a bottom and top view of a portion of the frame, showing the cavity in which the lifter-catch H and spring F operate. A mortise is cut into the lower portion of the frame, and a hole drilled in deeper to receive the spring F, Fig. 6, the bottom surface being cut in deeper than the upper surface, so as to afford a rest for the longer arm of the spring. The spring being placed in this receptacle, the lifter-catch H is placed in position, the lip *g* pressing upon the shorter arm of the spring, and is secured in place by means of the pin G, Fig. 7. M, Fig. 12, is a side view of that portion of the arm in which the frame is joined to the barrel, and which contains the lifter catch and spring. It shows the shoulder *y*, which, being brought in contact with the beveled shoulders *m m*, throws back the forward part of the catch H, freeing it from the shoulder *n* when the arm is opened, and permitting the ejector-spring to retract the ejector, and to throw the lifter back to its original position. O, Fig. 13, is a perspective view of the crank with its axle *b*, having on its end a screw-thread, $b'$, and a cam-slot, *s*, which may be formed of one piece of metal, as shown in the drawing, or may be made in two parts, the axle and crank separate, to be united by screw or otherwise. When placed in the arm, by passing the axle through the hole *x x* in recoil-shield, as shown in Fig. 18, the revolving ratchet P, Fig. 14, is screwed onto the end of the axle *b*, so that, when the cylinder is in position, as shown in Fig. 18, the notches in the revolving ratchet unite with the notches on the ejector, by means of which the crank O is turned by the hand D D in the operation of drawing back the hammer, and the cylinder revolved.

The inner surface of the revolving ratchet P rests against the shoulder on axle *b*, which shoulder projects a distance beyond the face of the recoil-shield, thus giving it a slight play backward and forward, by which the notches *z z* and *a a* may be readily disconnected. The end of the axle projecting beyond the front surface of the revolving ratchet serves to push back the axle, and with it the ratchet, in the process of opening and closing the arm, thus freeing the notches *a a* and *z z*, so that they do not interfere with each other in the opening and closing.

P, Fig. 14, is a side view of the revolving ratchet, which is provided with the notches *z z*, or may have but one notch or projecting point, or may have a number of notches or projecting points to correspond with the notches *a a* in the ejector, Fig. 1. It has a circular aperture through its center, with a thread cut in the same for the purpose of screwing it into the axle *b*.

D D, Fig. 15, is an inside and side view of the hand, whose axle *w'* passes through a circular aperture in the hammer R R, and, being operated upon by a spring, the nose *w* is kept in the cam-slot *s* at all times, and which serves to turn the crank O forward when the hammer is drawn back, thus revolving the cylinder, and to throw it back when the hammer is thrown forward, by which latter motion the revolving ratchet is again brought in contact with the notches *a a* on the ejector, for again revolving the cylinder when the hammer is again drawn back. R, Fig. 16, is a side view of a hammer, with the hand D D in its proper position when the hammer is removed from the arm. Fig. 17 is a side view of the crank O and the ratchet P, united as when placed in the arm, and showing their proper relations to each other. Fig. 18 is a sectional view of a portion of an arm with a revolving cylinder, showing the ejector A, Fig. 1, with its cap E, spring-stop C, and spiral spring in their proper positions, the lifter J with its shoulder *n* and nose *o* in its proper position, the lifter H H, with its spring F, pivot G, ears *k k*, and lip *g* in their proper positions, the crank O and ratchet P in their proper position and connection, the hand D D and the hammer R in their proper position and connection, and all these parts in their proper relation to each other, and to other parts of the arm. In Fig. 19 is shown a modification of the stop for the retracting-spring. In this modification, *t* represents a metal pin, through the head of which is made a hole, *r*, for receiving the shank of the L-shaped piece *l*. The shank of the pin *t* having been passed into the end of the retractor-spring, the two are then inserted in the hollow ejector or extractor stem so far as to bring the hole *r* under the lower end of the slot *c c*, when the pin *l* is inserted in the hole *r*. One arm of the pin *l* projects on one side of the square stem of the ejector, and its angle or elbow on the other side, so as to strike the shoulders *u u* in the cavity of the cylinder, and when the ejector is raised serve to compress the spring. A straight instead of an L-shaped pin would accomplish the same end as a stop, but it would be inconvenient to manipulate, as it is so small and put in such a contracted place.

What I claim as my invention, and desire to secure by Letters Patent, is—

1. The combination of an extractor having a hollow or tubular stem, and a spring having suitable stops or abutments arranged within said stem, the combination being and operating substantially as set forth.

2. A hollow extractor-stem having slots *c c*, the spring-stop described, spring, and the shoulders *u*, when combined for operation as and for the purpose described.

3. The combination of the extractor-stem, lifter, and lifter-catch, said catch being provided with ears *k k*, so that it may be thrown out of catch with the lifter, as desired, and as specified.

4. In combination with the hammer R and the hand D pivoted thereto, the crank O, and the nose *w*, and slot *s* for revolving the cylinder, substantially as described.

5. In combination with the hammer, hand, and crank, the recoil-plate interposed between the head of the crank or the crank-arm and the ratchet or semi-clutch on the shank or axle of said crank, so as to rotate the cylinder and at the same time cut off all escape for the gas between the cylinder and the lock mechanism, substantially as described.

6. A lifter-catch pivoted at right angles with the motion of the lifter, substantially as specified.

7. The combination, substantially as set forth, of a pivoted lifter, pivoted lifter-catch, and extractor-stem.

8. The combination of a pivoted lifter and lifter-catch, pivoted at a point in front of its extremity, adjacent the guard of the arm, substantially as set forth.

G. W. SCHOFIELD.

Witnesses:
J. S. FULLERTON,
THOS. P. RITCHIE.